Patented Sept. 26, 1933

1,927,840

UNITED STATES PATENT OFFICE 1,927,840

WORKING UP OXIDATION PRODUCTS PREPARED FROM SOLID HYDROCARBONS

Martin Luther, Mannheim, Germany, assignor to I. G. Farbenindustrie Aktiengesellschaft, Frankfort-on-the-Main, Germany No Drawing. Application July 23, 1930, Serial No. 470,220, and in Germany August 3, 1929

2 Claims. (Cl. 260—116)

The present invention relates to improvements in working up oxidation products prepared from solid hydrocarbons, waxes and materials containing the same.

Elsewhere there has been suggested a process for the recovery of oxidation products, according to which the crude products of an incomplete oxidation of solid hydrocarbons, waxes and like materials are subjected to a pressing process at temperatures at which the non-oxidized hydrocarbons, or other initial materials, remain solid, the liquefied constituents being separated. Otherwise the same results can be obtained by subjecting the said materials to a sweating process at a temperature below the melting point of the original hydrocarbon, wax or the like.

I have now found that a very advantageous, rapid and almost complete separation of the separate constituents of the said oxidation products from solid hydrocarbons, waxes and materials containing the same such as gas oils is effected by centrifugal pressing, i. e. by centrifuging the oxidation products, or the fractions separated therefrom by methods already known, as for example mixtures of acids, in sieve centrifuges, if desired in the presence of a diluent, at a temperature at which the constituents to be removed are in a fluid state. For example, a crude oxidation product, or a distillate from such product, may be centrifuged in a sieve centrifuge at a temperature below the melting point of the non-oxidized product, a separation of the oxidized constituents from the non-oxidized material being thereby effected. Mixtures of the acid constituents of the oxidation products which can be obtained by known methods as for example by saponification or extraction from the crude or distilled oxidation product, may be fractionated by consecutively centrifuging them at different temperatures. On the other hand the unsaponifiable constituents, such as are obtained for example from the ordinary or distilled crude oxidation product after the saponification and/or extraction, may be fractionally centrifuged and in this manner a separation into unsaponifiable neutral oxidation products such as alcohols, ketones, and the like, and unattacked initial material is effected. The unattacked initial material thus obtained may be advantageously employed again for a subsequent oxidation.

It is advantageous to work with high-speed sieve centrifuges which are lined with suitable filter material such as wool or flannel filters or with fine-meshed aluminium sieves and which are suitable for continuous operation, and in this manner a particularly high economy of the process is ensured. In some cases the application of a diluent is advantageous and effects a particularly rapid and complete separation of the individual fractions. If necessary, these individual fractions may be washed with suitable solvents or washing agents such as benzine, methanol, acetone, solutions of sulphur dioxide in methanol or ethanol, esters such as methyl formate, carbon tetra-chloride and the like, during the operation in the running centrifuge.

The following examples will further illustrate the nature of this invention, but the invention is not restricted to these examples. The parts are by weight.

*Example 1*

A crude oxidation product of hard paraffin wax having a saponification value of 220 is centrifuged at between 20° and 30° C. in a sieve centrifuge running at 900 revolutions per minute and having a drum diameter of 70 centimeters. The separation into a liquid and a solid fraction is completed in a few minutes. The liquid fraction is a pale syrupy oil the quantity of which amounts to about 70 per cent of the material introduced. The solid fraction (about 30 per cent) consists mainly of unattacked paraffin wax and may be subjected to another oxidation without further treatment.

*Example 2*

100 parts of a crude oxidation product of hard paraffin wax having a saponification value of 200 are centrifuged in a sieve centrifuge. After the separation, which is completed in a few minutes, the solid fraction, situated in the sieve drum, is washed by spraying with methanol. About 25 parts of paraffin wax having a content of wax of from 98 to 100 per cent remain behind.

*Example 3*

A crude oxidation produce from hard paraffin wax is saponified in the usual manner and the unsaponifiable constituents which settle out on allowing the soap solution to stand are separated off. These are separated into solid and liquid fractions by centrifuging according to Example 1. The liquid fraction, amounting to about from 40 to 50 per cent of the unsaponifiable material, consists mainly of high molecular alcohols while the solid fraction is a readily oxidizable paraffin wax.

Example 4

The distillate of an oxidation product of hard paraffin wax obtained by distillation in accordance with the process described in the British Patent No. 322,437 is saponified and the unsaponifiable constituents which settle out on allowing the soap solution to stand are separated off. These constituents are centrifuged at 15° C. in a sieve centrifuge having a drum diameter of 100 centimeters and a speed of 1200 revolutions per minute. The oxygenated impurities such as alcohols and ketones and those which arrest the oxidation such as unsaturated hydrocarbons are removed in a few minutes. The last traces of impurities are removed by spraying with a mixture of equal parts of methanol and benzine. A readily oxidizable paraffin wax remains behind in the centrifuge.

Example 5

A mixture of acids which has been obtained from the distillate of an oxidation product, obtained as described in the foregoing example, is centrifuged at 15° C. in a sieve centrifuge. The separation into liquid acids of the nature of olein and a pale solid fatty acid which sets at 41° C. is effected in a few minutes. The fatty acid is then fractionated by gentle heating to from about 30° to 32° C. and simultaneous centrifuging. The acids centrifuged off have a setting point of 39° C. whereas a white fatty acid having the setting point of 46° C. remains in the centrifuge.

Example 6

1000 parts of the unsaponifiable materials separated from an oxidation product of soft paraffin wax as described in Example 1 are mixed with 500 parts of methanol and then centrifuged in a sieve centrifuge. After centrifuging for a few minutes the oxygenated impurities such as alcohols and ketones and those which arrest the oxidation such as unsaturated hydrocarbons are removed and a readily oxidizable from 98 to 100 per cent paraffin remains behind in the centrifuge.

What I claim is:—

1. The process of separating the constituents of oxidation products from the destructive oxidation of solid hydrocarbons which comprises saponifying such oxidation product and separating the unsaponifiable constituents from the whole mass by subjecting the latter to centrifugal pressing at a temperature at which the constituents to be removed are in a fluid state.

2. The process for separating the constituents of oxidation products from the destructive oxidation of solid hydrocarbons which comprises saponifying such oxidation produce with the aid of an aqueous alkaline agent, separating the soap solution from solid constituents and subjecting the latter to centrifugal pressing at a temperature at which the constituents to be removed are in a fluid state.

MARTIN LUTHER.